Sept. 2, 1924.
A. J. HOLLE
1,507,179
LAWN MOWER
Filed Jan. 10, 1922   2 Sheets-Sheet 1
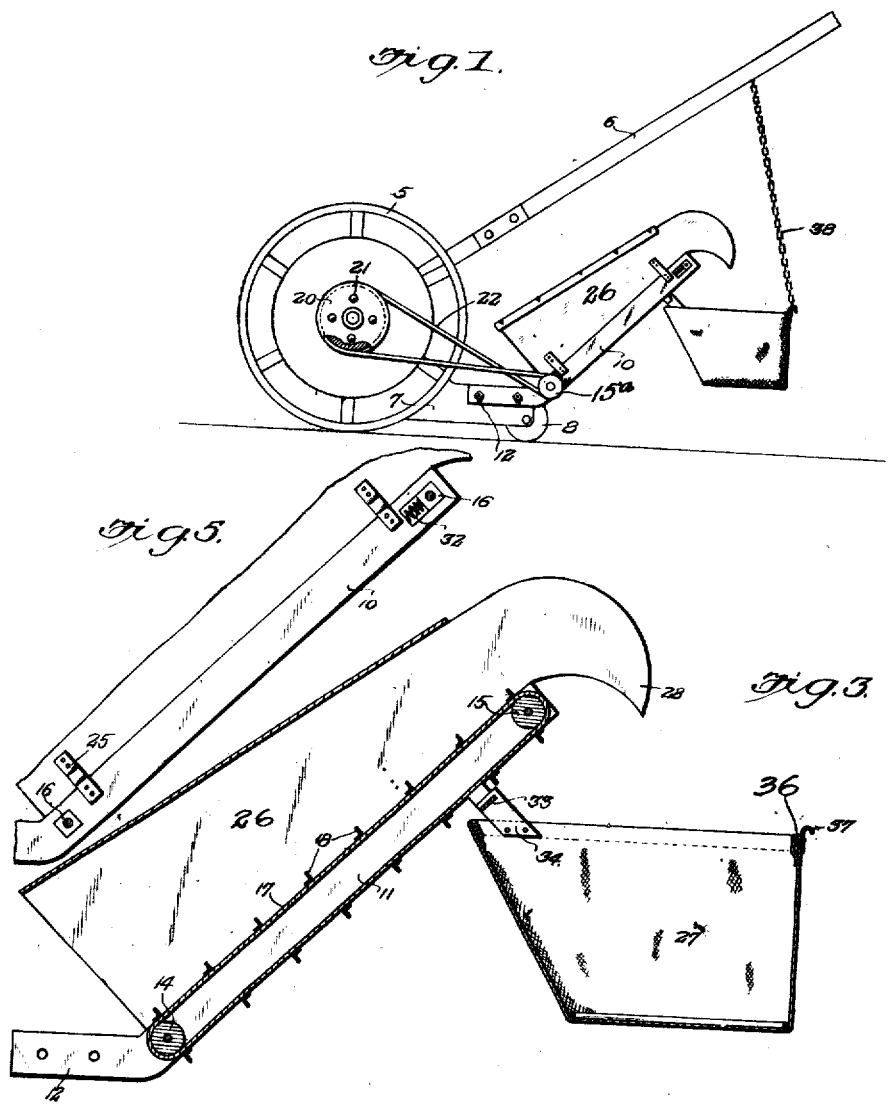

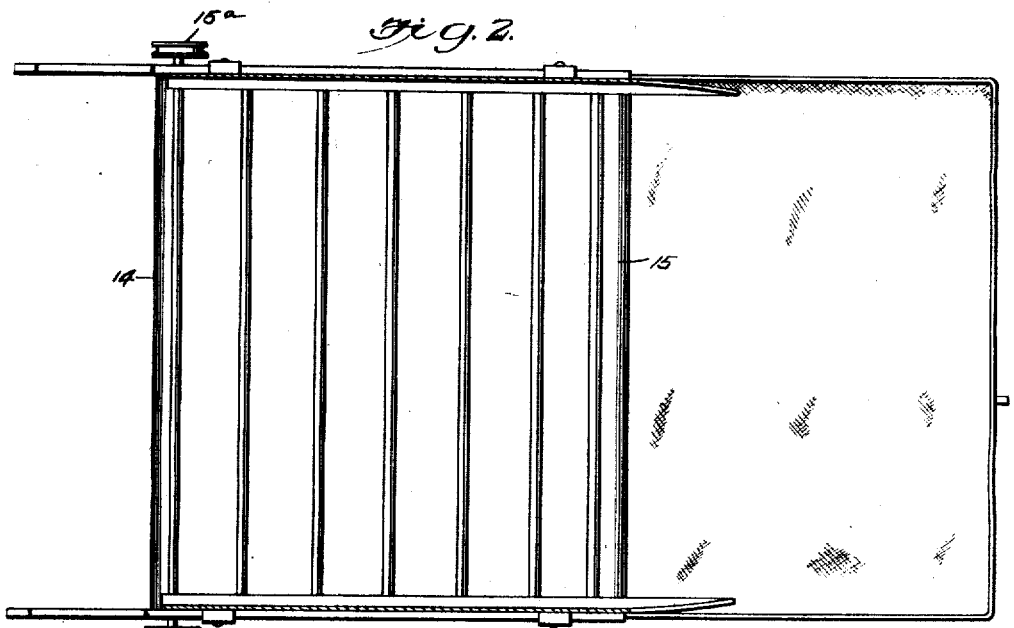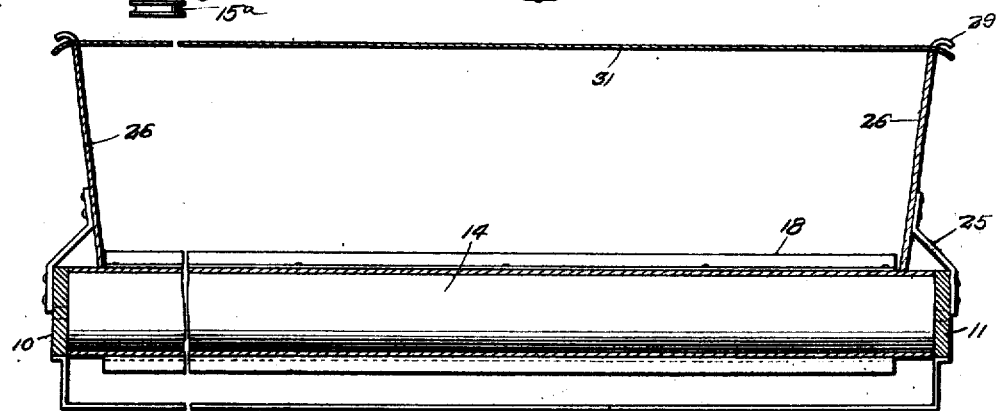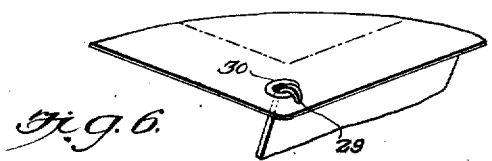

Patented Sept. 2, 1924.

1,507,179

UNITED STATES PATENT OFFICE.

ALBERT J. HOLLE, OF RUSHFORD, MINNESOTA.

LAWN MOWER.

Application filed January 10, 1922. Serial No. 528,261.

*To all whom it may concern:*

Be it known that I, ALBERT J. HOLLE, a citizen of the United States, residing at Rushford, in the county of Fillmore and State of Minnesota, have invented certain new and useful Improvements in a Lawn Mower, of which the following is a specification.

This invention relates to lawn mowers and more particularly to an attachment for receiving the severed grass from a mower as the machine advances over the ground.

The primary object of the invention resides in the provision of a mower attachment adapted for connection to the conventional type of manually or power operated lawn mower, whereby the severed grass is elevated and discharged into a suitable container disposed rearwardly of the machine to catch and carry the cut grass during the progress of the mower over the ground.

Another object of the invention resides in a mower attachment wherein the conveying mechanism is driven from the traction wheel or wheels of the mower and discharged in a detachable container, permitting the same to be emptied from time to time during the operation of the machine over the ground and without stopping the same.

Another and very important object of the invention is the provision of a lawn mower attachment designed for use and adapted to be connected to various types of manually or power operated mowers, and one in which the parts are extremely simple in construction, easily assembled, rigid and durable, highly efficient in operation, practical and capable of being manufactured at a very low cost whereby its commercial possibilities are greatly enhanced.

The invention will be best understood from a consideration of the following description taken in connection with the accompanying drawings, forming a part of the specification, with the understanding that the invention is not confined to any strict conformity with the showing in the drawing, but may be changed and modified so long as such changes and modifications mark no material departure from the salient features of the invention as expressed in the subject matter being claimed.

In the drawings:—

Figure 1 is a side view showing the invention as attached to a conventional type of lawn mower, Fig. 2 is a top plan view of the attachment with the cover removed, Fig. 3 is a detached view of the attachment when removed from the mower showing the conveying mechanism in section.

Fig. 4 is a vertical section through the conveying mechanism,

Fig. 5 is a detail view of the side supporting bars for the elevating mechanism, and Fig. 6 is another detail view showing the manner of attaching the cover to the conveyor.

Referring now to the drawings, wherein like parts designate corresponding parts throughout the several views, 5 designates the traction wheel and 6 the upwardly and rearwardly directed steering and guiding handle for the mower, the same being provided with downwardly and rearwardly extending frame plates 7 to which the ground supporting rollers 8 are rotatably mounted for supporting the mower, all of which are of a standard construction universal to both power operated and manually operated lawn mowers now in general use.

The attachment which constitutes my invention primarily consists of an elevating mechanism and a suitable container or receiver detachably carried thereby to receive the severed and cut grass from the mower which falls rearwardly of the machine as the same passes over the ground. The conveyor proper consists of the parallel side bars 10, 11, the front ends 12 of which are disposed at an obtuse angle and lie in parallel relation with the plates 7 of the machine to which they are connected by suitable fastening elements 12 as clearly shown by Fig. 1 of the drawing. Journaled for rotation between the side bars 10, 11, I have provided a pair of front and rear spaced rollers 14, 15, journaled in suitable boxings 16 and adapted to receive an endless conveyor belt 17, said belt being provided with suitable L-shaped, horizontally extending bars 18 which receive the grass as the same is cut by the knives and carries the same rearwardly and upwardly over the roller 15 to be discharged within the container subsequently to be referred to. The roller 14 is provided with suitable pulleys 15ª on the outer ends thereof and the traction wheel 5 is also provided with a pulley 20 secured thereto as at 21 whereby the cross belt 22 may be trained about said pulleys so that the endless belt will derive power from the traction wheel as the machine advances over the ground.

Connected to the respective side bars 10, 11, by suitable inwardly directed bent straps or brackets 25, are positioned the angularly inclined guide plates 26 which extend rearwardly and are downwardly tapered as shown at 28 so as to direct the grass into the receiver 27 positioned below the roller 15 to properly catch the grass as the same is conveyed. The guide plates 26 are provided with pointed hook members 29 at certain positions along their respective sides, said extensions passing through suitable eyelets 30 formed in a flexible cover plate 31 which prevents the grass from being blown out of the conveyor during the progress thereof upwardly to be received by the container 27 above referred to. Referring to Fig. 5, it will be observed that the rear roller and boxing 16 are suitably held in position by the spring 32 which maintains the conveyor belt taut, a suitable downward extension 33, being provided so as to be received in a slot formed in an attaching plate 34 carried on each side of the container to permit the same to be readily carried by said member 33 in the manner clearly suggested by Fig. 3 of the drawing. The container proper may be of any suitable shape or size preferably shorter at its front than at its rear in order to be positioned in close proximity to the rear roller 15, the container in this instance being constructed of a frame 36 covered by canvas or other suitable material so as to be of extremely light construction, the rear wall of said container being provided with a hook 37 to which one end of a flexible chain 38 may be connected with the handle 6 in the manner shown by Fig. 1 of the drawings.

By reason of this construction, it will be readily seen that I have provided a novel and improved lawn mower attachment capable of use in connection with different types of machines and one which can be easily installed with facility and ease and without excessive skill or labor and removed when so desired for cleaning purposes.

In the accompanying drawings, I have illustrated my invention embodied in one form by way of example, and which in practice has been found to be highly satisfactory in obtaining the desired results. It will be obvious however that other embodiments may be adopted and that various changes in the details of construction may be resorted to by those skilled in the art without departing from the spirit of the invention. It is furthermore understood that the invention is not necessarily limited or restricted to the precise elements shown except in so far as such limitations are specified in the subject matter being claimed.

Having shown and described my invention, what I now claim as new and desire to secure by Letters Patent of the U. S. is:—

1. A lawn mower attachment comprising, a pair of spaced upwardly extending and rearwardly inclined parallel bars, each having its lower end terminal portion formed at an obtuse angle to form attaching means therefor, a conveyor element supported by said bars and operated from the mower, a plurality of braces secured to the outer side of each bar and extending inwardly over the upper edge of the said bars, inclined guide plates supported by said braces above said element and having integral outwardly turned hook members along their upper edges, and a flexible cover plate having eyelets along its side edges for the insertion of said hook members.

2. A lawn mower attachment comprising, a pair of spaced upwardly extending and rearwardly inclined parallel bars, each having its lower end terminal portions formed at an obtuse angle to form attaching means therefor, a conveyor element supported by said bars and operated from the mower, a plurality of braces secured to the outer side of each bar and extending inwardly over the upper edge of said bars, inclined guide plates supported by said braces above said element and having integral outwardly turned hook members along their upper edges, a flexible cover plate having eyelets along its side edges for the insertion of said hook members, a transversely extending supporting member suspended from said bars, a removable container, and slotted plates for detachably attaching said container to said member.

In testimony whereof, I affix my signature hereto.

ALBERT J. HOLLE.